United States Patent [19]
Miura

[11] Patent Number: 6,036,348
[45] Date of Patent: Mar. 14, 2000

[54] LUGGAGE MANAGEMENT SYSTEM

[75] Inventor: Okimi Miura, Sagamihara, Japan

[73] Assignee: Matsushita Electric Industrial Co., Ltd., Osaka, Japan

[21] Appl. No.: 08/453,081

[22] Filed: May 30, 1995

[30] Foreign Application Priority Data

Aug. 3, 1994 [JP] Japan ................................. 6-182250

[51] Int. Cl.[7] ................................................ G06F 19/00
[52] U.S. Cl. ..................... 364/478.13; 235/375; 235/384
[58] Field of Search ................................. 364/478, 401, 364/402, 403, 407, 478.13, 478.14, 478.15, 478.07, 478.01; 235/384, 375, 380, 382, 385; 395/213, 228

[56] References Cited

U.S. PATENT DOCUMENTS

| | | | |
|---|---|---|---|
| 3,908,113 | 9/1975 | Maxham et al. | 235/375 |
| 3,988,570 | 10/1976 | Murphy et al. | 235/375 |
| 4,974,166 | 11/1990 | Maney et al. | 364/478 |
| 5,051,565 | 9/1991 | Wolfram | 235/384 |
| 5,225,990 | 7/1993 | Bunce et al. | 364/478 |
| 5,401,944 | 3/1995 | Bravman | 235/375 |
| 5,469,363 | 11/1995 | Saliga | 364/478 |
| 5,478,991 | 12/1995 | Watanabe et al. | 235/375 |

*Primary Examiner*—Joseph Ruggiero
*Attorney, Agent, or Firm*—Watson Cole Stevens Davis, P.L.L.C.

[57] ABSTRACT

A luggage management system arranged so as to improve the efficiency of parcel collection, parcel examining and parcel delivery, to save the labor of operators, to accurately manage parcels, and to improve the efficiency and accuracy of parcel tracing operation is provided. When a parcel checker examining a parcel being conveyed depresses an "examine" switch, an examine result signal is transmitted from an examine part to an electronic tab through an antenna. When this signal is received by a loop antenna, an electronic tab control circuit is activated, and parcel information stored beforehand in a memory is modulated into a signal having a predetermined frequency to be transmitted from a transmitter to the exterior of the system through the loop antenna. This parcel information is received by the antenna, and the parcel information of each parcel is read in the examine part which carries out collation of data with that stored already for confirmation together with parcel sorting and management.

3 Claims, 9 Drawing Sheets

LUGGAGE MANAGEMENT SYSTEM

BACKGROUND OF THE INVENTION

This invention relates to a luggage management system used in the field of luggage transportation and distribution, such as, quick home delivery or transportation of luggage to its destination, and more particularly to a system of the kind described above in which a portable convenient terminal having functions of issuing, displaying, registering, examining and recording information including the serial slip number and destination of luggage, such as, a parcel is used together with an electronic tab so as to manage transportation of such luggage.

In a prior art luggage management system in which parcels collected by a parcel collector are transported so as to be quickly delivered to their destination, a portable convenient terminal of the above-described kind was carried by the hand of the parcel collector to the consignor's home to receive the parcel from the consignor, and various data regarding the received parcel to be transported were inputted into and processed by the portable convenient terminal. Such a portable convenient terminal was constructed by combining various parts including a keyboard part, a data display part, a control part, a memory part, a power supply part and a printer part. Information including the sizes, weights and number of luggage and also their serial slip numbers and destination was inputted to the portable convenient terminal by the hand of the parcel collector, and bar codes printed on slips were read by a bar code reader so as to store data of the received parcels in the memory part of the terminal. When so required, the information regarding each parcel was printed out on a label, and the label having the destination code and other information printed thereon was attached to the received parcel.

In the prior art portable convenient terminal of this kind, it was a common practice that the operator sorted the received parcels by reading the information including the destination codes printed on the label attached to the received parcels. Such a manner of sorting was a great factor resulting in lowered efficiency and accuracy of the parcel sorting operation, parcel management and parcel tracing operation.

Recently, the bar code of the parcel label printed on the slip was read by a bar code reader manipulated by the operator so as to mechanize some of the above operations.

However, because of the fact that parcels have different sizes and shapes, the prior art portable convenient terminal of this kind designed to sort the parcels by reading the bar code of the parcel label by manipulation of the bar code reader could not improve the efficiency and accuracy of the parcel sorting operation.

Also, the parcel information printed on the slips attached to the parcels to indicate the sizes, weights, number of parcels, serial slip numbers, consignees' addresses, consignors' addresses, parcel contents, etc., that is, the information registered on the bar code label only is not enough to grasp the particulars of the parcels. Therefore, the step for collating the parcel information with the bar code number is troublesome and depends greatly on visual inspection by the operator, and the necessity for the visual inspection by the operator was a great factor resulting in the lowered efficiency and accuracy of the sorting operation, parcel management and parcel tracing operation. Further, there was no consideration for strictly ensuring the security guaranteeing the safeguard, safety and reliability of quick home delivery of a customer's important parcel. Thus, loss of parcels due to an error during the sorting step and parcel management step was inevitable.

SUMMARY OF THE INVENTION

With a view to solve such prior art problems, it is an object of the present invention to provide a luggage management system in which information of luggage, such as, a parcel is inputted beforehand into an electronic tab attached to the parcel, and, after transmitting a request signal to the electronic tab attached to the parcel to read out the information written in the electronic tab, the parcel information is transmitted by radio waves to be received by a portable convenient terminal examining the signal transmitted from the electronic tab, so that the parcel and freight charge collection, parcel sorting and management, and parcel tracing can be efficiently, safely and reliably carried out.

An embodiment of the luggage management system of the present invention which attains the above object comprises an electronic tab in which information regarding delivery of a parcel is written beforehand, and a portable convenient terminal transmitting a parcel information request signal to the electronic tab, the electronic tab transmitting the parcel information to the portable convenient terminal and also displaying the parcel information in response to the request signal, and the portable convenient terminal receiving the parcel information comparing the received parcel information with information stored therein to detect whether or not the former information coincides with the latter information.

As described above, the luggage management system of the present invention is composed of an electronic tab attached to a parcel and a portable convenient terminal writing and reading parcel information in and read from the electronic tab. The electronic tab is set beforehand on an electronic tab issue part of the portable convenient terminal examining the output appearing from the electronic tab, and, when parcel information is inputted from a keyboard part of the portable convenient terminal, the parcel information is also written in the electronic tab. The electronic tab having the parcel information inputted therein is attached to the received parcel to be transported together with the parcel. The parcel information inputted to the electronic tab is displayed on a data display part of the portable convenient terminal when a display request signal is received through a switch or from an external source when so required. Also, in response to the externally inputted request signal, the information written in the electronic tab is outputted by radio waves from a transmitter part of the electronic tab. On the other hand, the portable convenient terminal examining the output from the electronic tab supplies the request signal to the electronic tab to receive the parcel information sent by the radio waves.

DESCRIPTION OF THE PREFERRED EMBODIMENTS

Preferred embodiments of the present invention will now be described by reference to the drawings.
Embodiment 1

A first embodiment of the present invention will now be described by reference to FIGS. 1 to 7.

Figure 1:
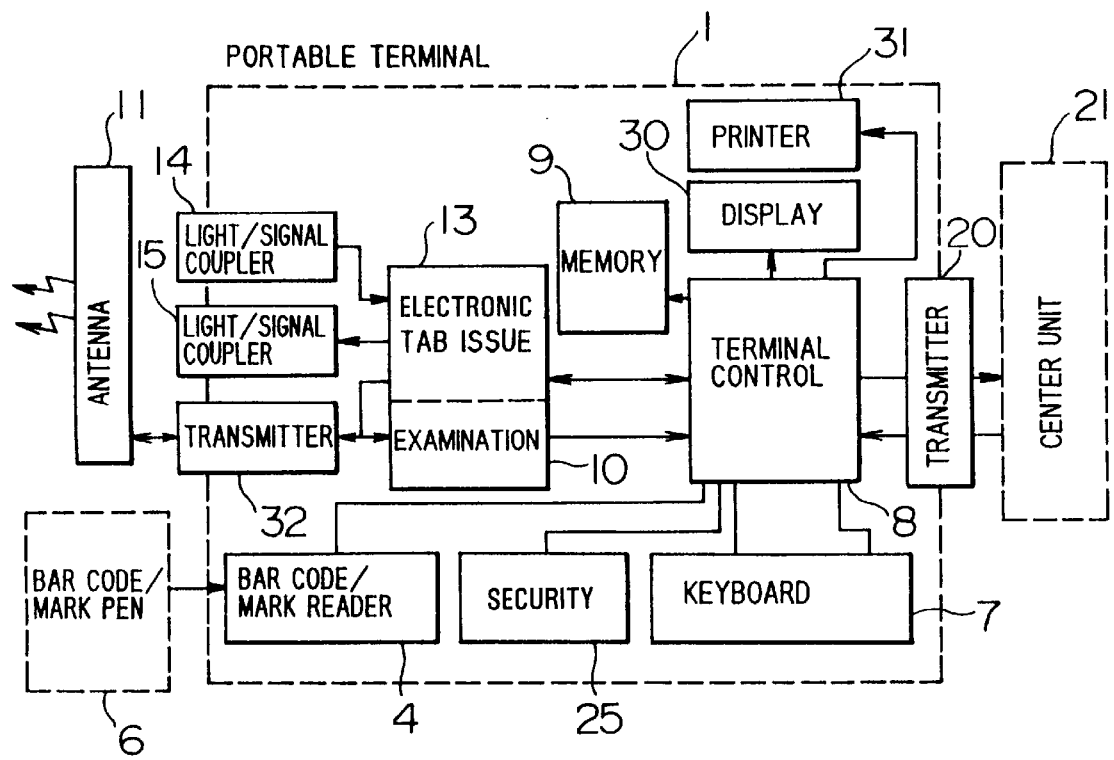
FIG. 1 is a block diagram showing the structure of an embodiment of the luggage management system according to the present invention.
Figure 1:
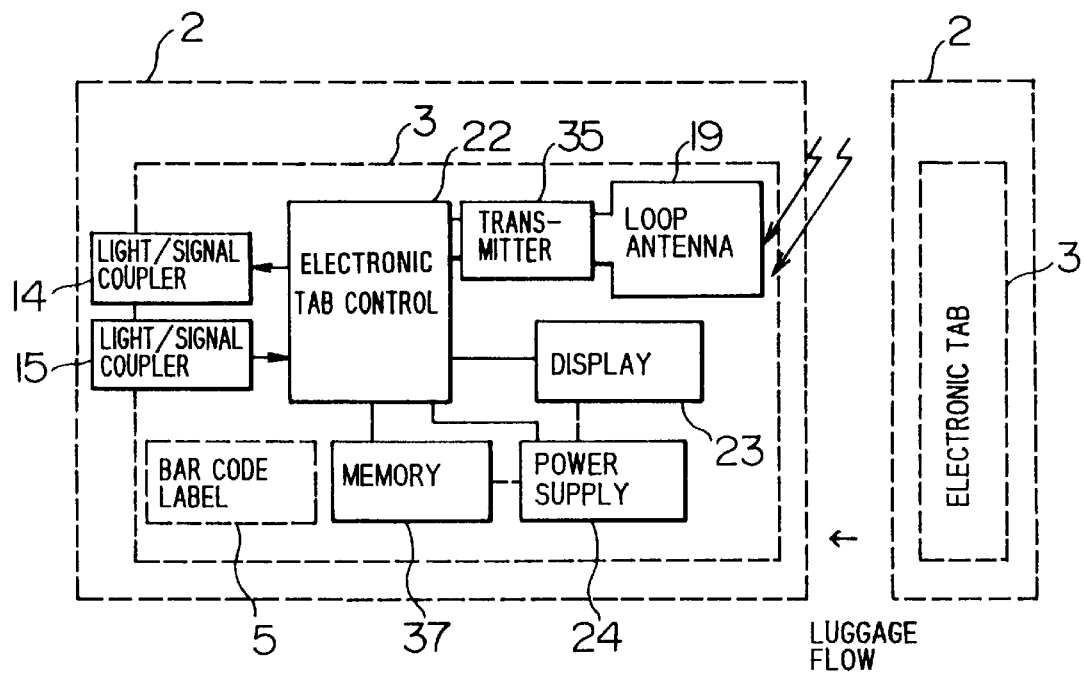
Figure 2:
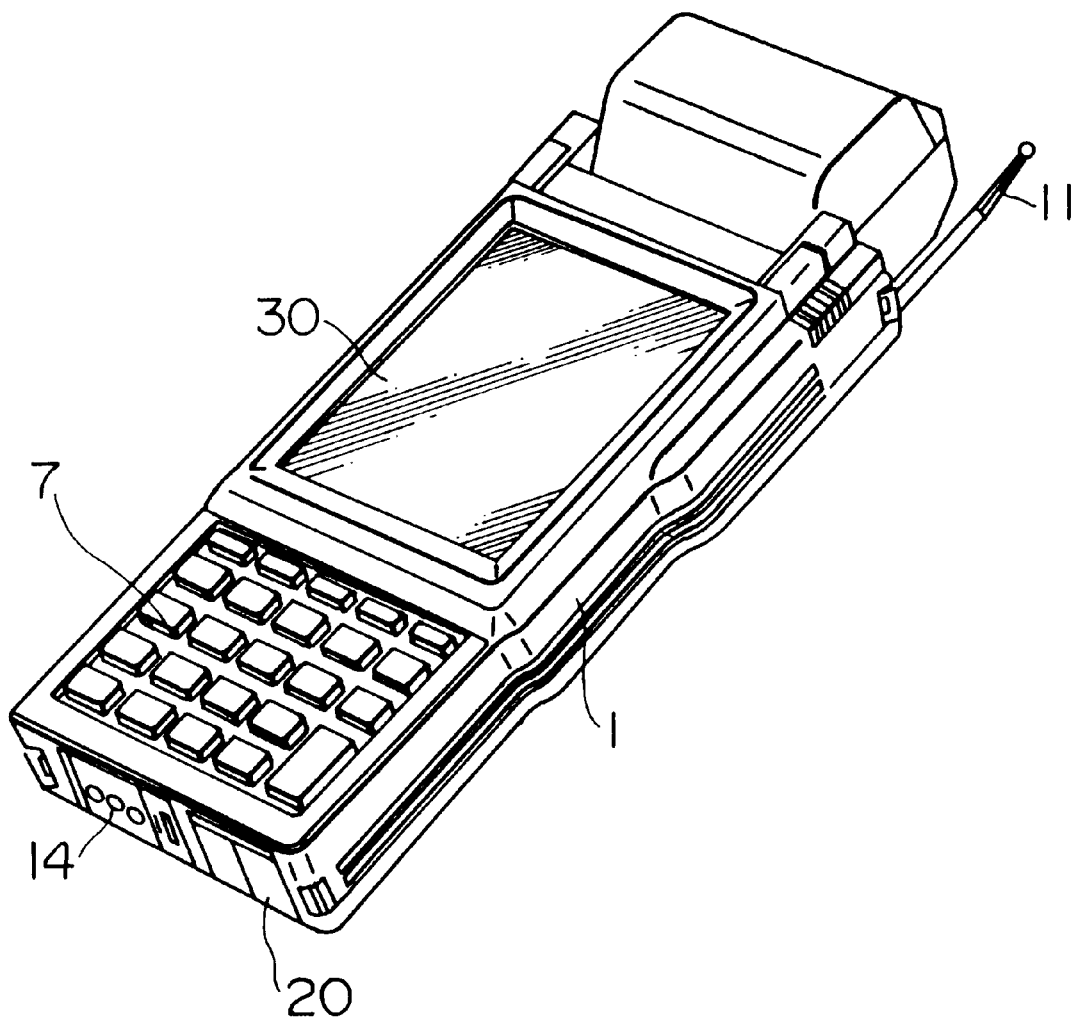
FIG. 2 is an enlarged perspective external view of the portable convenient terminal used in the first embodiment of the luggage management system of the present invention.

FIG. 1 is a block diagram showing the structure of the first embodiment of the luggage management system according to the present invention, and FIG. 2 is an enlarged perspective external view of the portable convenient terminal used in the first embodiment of the luggage management system shown in FIG. 1.

Referring to FIG. 1, a portable convenient terminal 1 is associated with an electronic tab 3 attached to a parcel 2, so that various data regarding the parcel 2 are inputted to and outputted from the portable convenient terminal 1 to be managed by the terminal 1. A bar code/mark reader part 4 of the terminal 1 reads by a bar code/mark pen 6 a bar code label 5 on the slip of the electronic tab 3. A keyboard part 7 of the terminal 1 inputs data including the size and weight of the parcel 2 together with the address, name and telephone number of the consignee, etc. to be written on the slip. A control part 8 of the terminal 1 controls the operation of the system, determines the destination code and calculates the parcel freight charge. A memory part 9 of the terminal 1 stores the destination codes, the conversion list used for the calculation of the freight charge, and various input data. A examination part 10 of the terminal 1 transmits a radio-frequency examining signal through an antenna 11 so as to examine the electronic tab 3. A display part 12 of the terminal 1 informs the input and output data to the user of the terminal 1. An electronic tab issue part 13 of the terminal 1 transmits various data by radio waves through light/signal coupler parts 14, 15 or through antennas 11, 19 to input various data to the electronic tab 3 so as to issue the tab. A transmitter part 20 of the terminal 1 transmits various data stored in the terminal 1 to a center unit 21 that is a high order computer and receives an emergency command and dictionary data from the center unit 21 that is the high order computer, when so required. A control part 22 of the electronic tab 3 controls a display part 23 to display the parcel data or controls a transmitter part 35 to transmit the parcel data through a loop antenna 19 in response to a request signal inputted from the terminal 1. A power supply part 24 of the electronic tab 3 supplies required power to the tab 3, and a chargeable battery is used as this power supply part 24. A security part 25 of the electronic tab 3 collates an identification key number inputted from the keyboard part 7 of the terminal 1 with its internal data so as to guarantee the security. This identification key number is selected from a random number table consisting of a combination of the personal identification numbers x of individual operators in charge and the two-digit sums y related to the numbers of the year, month and day of operation, for example, y=15 in case Nov. 14, 1990→11+14+90=115, by discarding the first digit→15. This random number table is strictly issued to the operators in charge only and is not informed to any other persons. That is, unless each individual identification key number is inputted from the keyboard part 7 of the terminal 1, the system is not placed in operation, so that neither parcel information nor parcel data can be written in the electronic tab 3. The portable convenient terminal 1 further includes another display part 30 and a printer part 31. Another transmitter part 32 of the terminal 1 is associated with the antenna 11, while the transmitter part 35 of the electronic tab 3 is associated with the antenna 19. A memory part 37 of the electronic tab 3 stores the data regarding the parcel 2.

Figure 3:
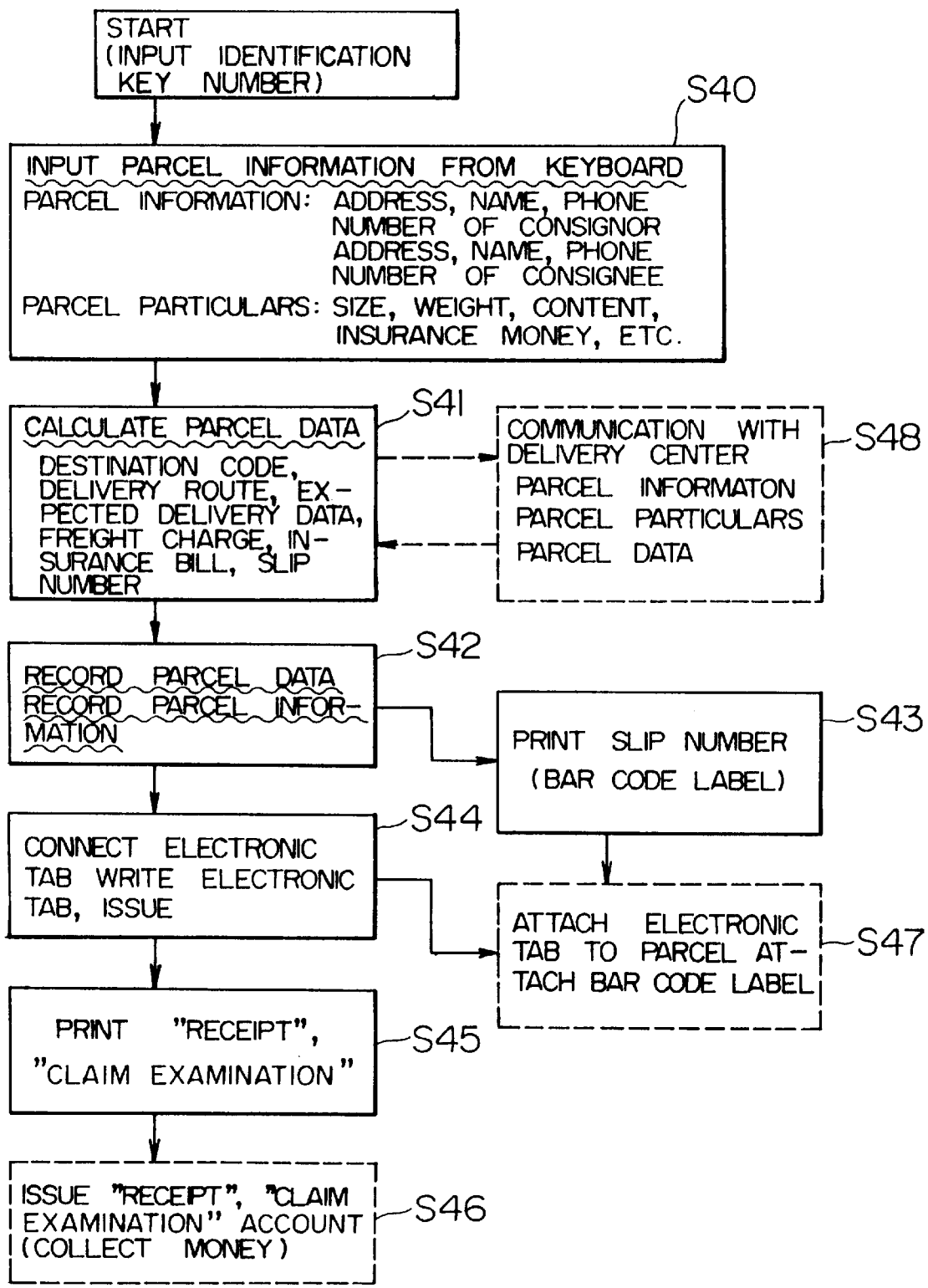
FIG. 3 is a flow chart showing the steps of parcel collection in the first embodiment of the luggage management system of the present invention.

The operation of the first embodiment of the luggage management system of the present invention will now be described by reference to FIGS. 3, 4 and 5. FIG. 3 is a flow chart showing the steps of parcel collection, FIG. 4 is a flow chart showing the steps of examining, and FIG. 5 is a flow chart showing the steps of parcel delivery.

In a step S40 in FIG. 3, the portable convenient terminal 1 for issuing the electronic tab 3 and examining a parcel is carried by the hand of a parcel collector to the site of a consignor's home, and information of a parcel 2 (referred to hereinafter as parcel information) is inputted from the keyboard part 7 in the face of the consignor. The parcel information written on a slip includes the address, name and telephone number of the consignor, the address, name and telephone number of a consignee, and particulars of the parcel 2 (the size and weight of the parcel 2 or the content, the amount of money to be insured, etc.). In a step S41, the control part 8 of the terminal 1 determines the destination code, delivery route and expected date of parcel delivery and calculates the freight charge, insurance bill, serial slip number, etc. In a step S42, the parcel data described above are stored in the memory part 9 of the terminal 1. In a step S43, the "serial slip number" (the bar code label) is printed by the printer part 31 of the terminal 1. When such parcel information is set beforehand in the electronic tab 3, the electronic tab issue part 13 of the terminal 1 writes the parcel information and parcel data in the electronic tab 3 through the light/signal coupler parts 14 and 15 in a step S44. At the same time, the "receipt" and the "claim examine" are printed by the printer part 31 in a step S45 under control of the control part 8 of the terminal 1. In a step S46, the parcel collector collects the freight charge in exchange for the "claim examine" and the "receipt" described above. Then, in a step S47, the parcel collector bonds the slip having the printed "serial slip number", that is, the printed bar code label, to the parcel 2 and attaches the electronic tab 3 to the parcel 2. The parcel collector conveys the collected parcel 2 to the location of the center unit 21. The parcel information transmitted from the transmitter part 20 of the terminal 1 is supplied to the center unit 21, that is, the stored data are transmitted to the high order computer. In a step S48, the terminal 1 may receive the emergency command, dictionary data, delivery route information, etc. from the center unit 2 that is the high order computer through the transmitter part 20.

Figure 4:
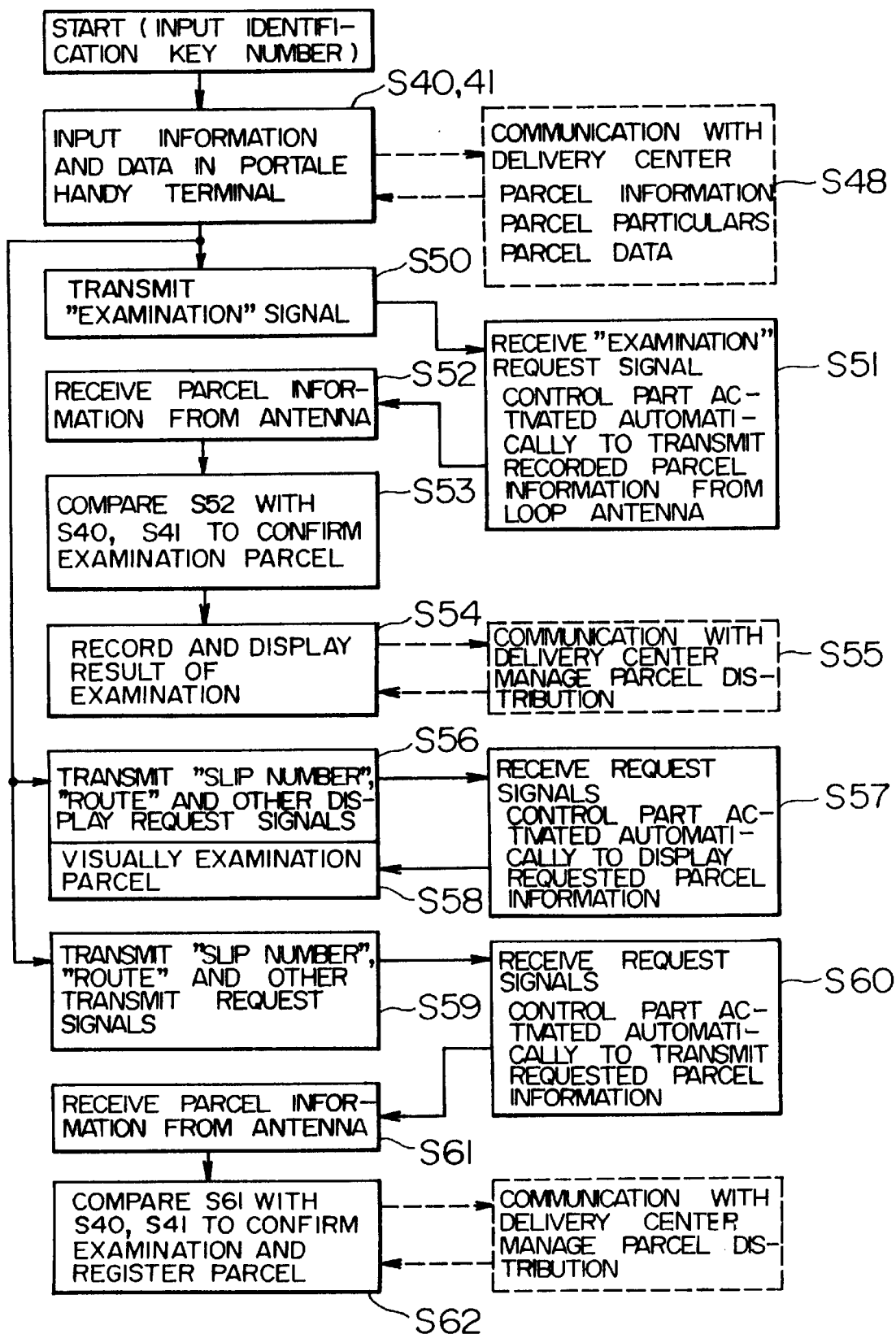
FIG. 4 is a flow chart showing the steps of examining (part 1) in the first embodiment of the luggage management system of the present invention.
Figure 5:
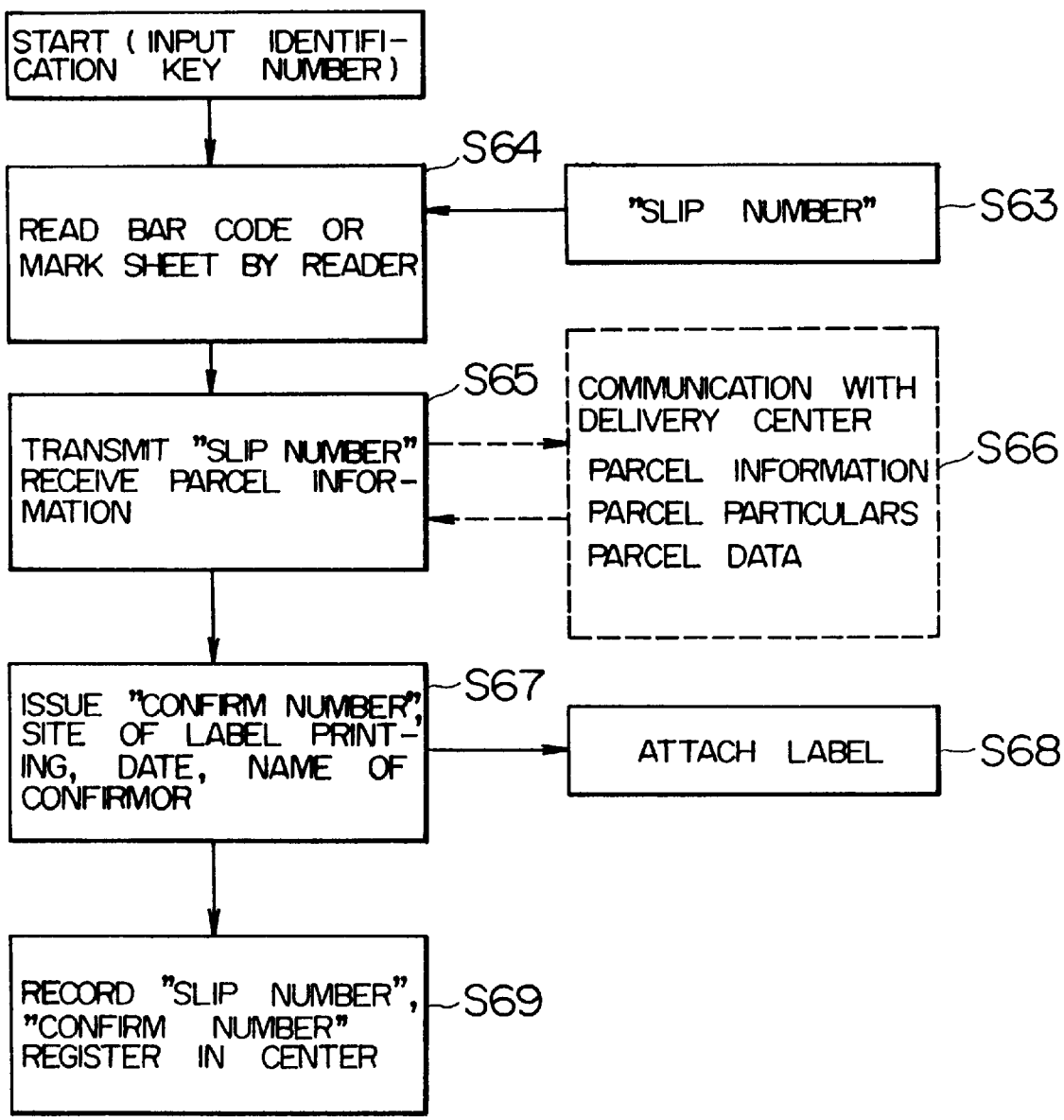
FIG. 5 is a flow chart showing the steps of examining (part 2) in the first embodiment of the luggage management system of the present invention.

FIG. 4 is a flow chart showing the steps of parcel examining in the first embodiment of the present invention.

This parcel examining refers to the operation in which the electronic tab 3 is used to sort, manage and trace the parcel 2. In a step S50, the parcel collector carrying the portable convenient terminal 1 depresses an "examine" switch on the terminal 1. In response to the depression of this switch, the examine part 10 of the terminal 1 generates the examine signal which is transmitted through the radio antenna 11 to the electronic tab 3. When the loop antenna 19 of the electronic tab 3 receives the transmitted examine signal, the circuit of the electronic tab control part 22 is automatically turned on in a step S51, and the parcel information and parcel data stored beforehand in the memory part 37 are modulated into a signal having a predetermined frequency to be externally transmitted through the transmitter part 35 and the loop antenna 19. At the same time, the parcel information and parcel data are displayed for a predetermined period of time only on the display part 23 which may be a flat type LCD array. In a step S52, the transmitted parcel information and parcel data are received by the antenna 11 of the terminal 1 and sent through the transmitter part 32 to the examination part 10 which reads the parcel information and parcel data of each individual parcel 2. In a step S53, the examination part 10 executes examining, collating, confirming, sorting and managing the data stored already. In a step S54, the result of examining the parcel 2 is stored in the memory part 9 of the terminal 1 and displayed on the display part 30 under control of the terminal control part 8. At the same time, the terminal control part 8 makes communication with the center unit 21 through the transmitter part 20 in a step S55 so as to manage the parcel 2.

When the terminal 1 transmits a display request signal to the electronic tab 3, the specified information only among the parcel information and parcel data stored in the electronic tab 3 is displayed on the display part 30 of the terminal 1 in a step S57. In a step S58, the operator visually examines the result of examining the parcel 2 from step S54.

In a step S59, the terminal 1 transmits request signals requesting transmission of the "serial slip number", "route", etc. to the electronic tab 3. In a step S60, in response to the transmission of the above signals to the electronic tab 3, the electronic tab control part 22 is automatically activated and transmits the requested parcel information through the loop antenna 19. In a step S61, the antenna 11 of the terminal 1 receives the transmitted parcel information. In a step S62, the examine part 10 examines the parcel 2, and the result is registered in the memory part 9 of the terminal 1.

FIG. 5 is a flow chart showing the steps of examining following the steps shown in FIG. 4. In steps S63 and S64 among steps S63 to S69 shown in FIG. 5, the bar code label 5 of the "serial slip number" attached to the parcel 2 is read by the bar code/mark pen 6 extending from the bar code/mark reader part 4 of the terminal 1.

Figure 6:
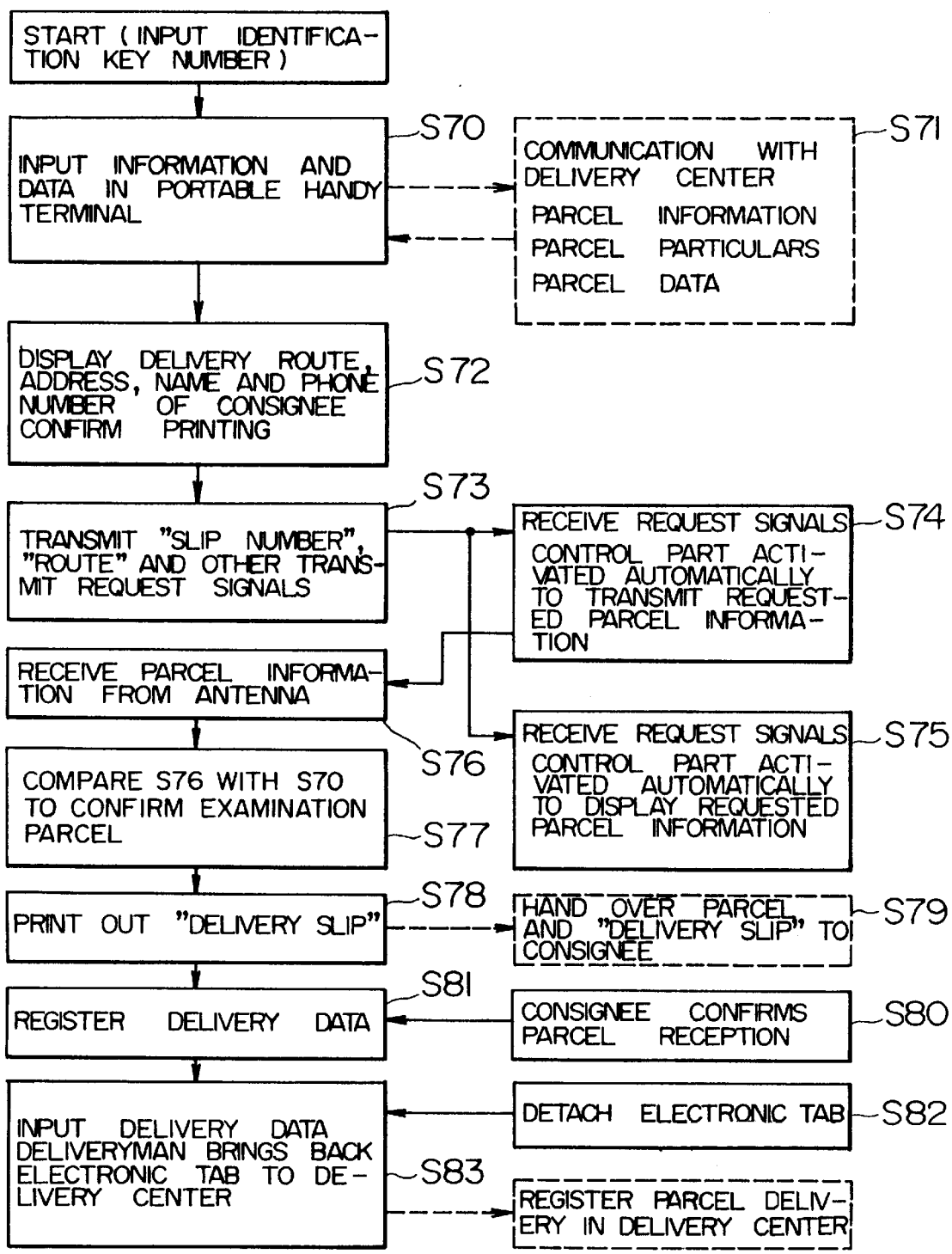
FIG. 6 is a flow chart showing the steps of delivery in the first embodiment of the luggage management system of the present invention.

FIG. 6 is a flow chart showing the steps of parcel delivery in the first embodiment of the luggage management system of the present invention. The flow from a step S70 to a step S77 in FIG. 6 is the same as those described already in FIG. 4. When a deliveryman delivers the parcel 2 to the consignee's home, the address, name and telephone number of the consignee are displayed on the data display part 23 of the electronic tab 3 in response to the display request signal transmitted from the portable convenient terminal 1, and the deliveryman confirms the consignee by viewing the data display part 23. In a step S78, a "delivery slip" is printed out by the printer part 31 of the terminal 1. In a step S79, the deliveryman hands over the parcel 2 to the consignee together with the "delivery slip". In a step S80, the consignee inputs a reception confirmation signal to the terminal 1. Then, in a step S81, the parcel received date is registered in the memory part 9 of the terminal 1. The parcel received date is automatically recorded on the "delivery slip", and, at the same time, the electronic tab 3 transmits the data to the terminal 1 and records the data in its memory part 37. In a step S82, the deliveryman detaches the electronic tab 3 from the parcel 2, and, in a step S83, the deliveryman brings back the electronic tab 3 to a delivery center.

Figure 7:
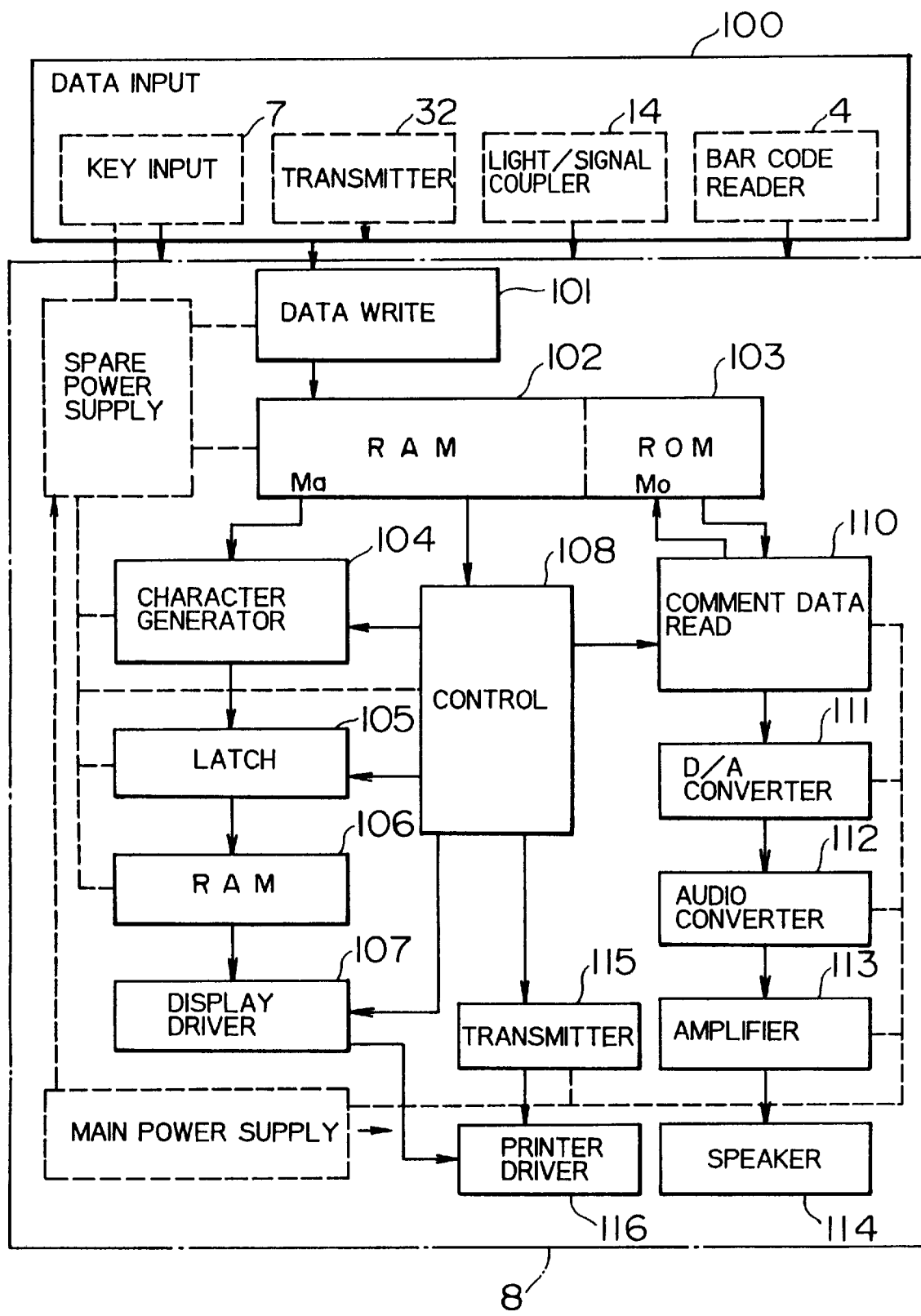
FIG. 7 is a block diagram showing the structure of the portable convenient terminal used in the first embodiment of the luggage management system of the present invention.

FIG. 7 is a block diagram showing the structure of the portable convenient terminal 1 used in the first embodiment of the luggage management system of the present invention.

The operation of the terminal control part 8 will now be described by reference to FIG. 7.

The portable convenient terminal 1 includes a data input part 100 for inputting parcel information and parcel data of each individual parcel 2. The data input part 100 is formed of the key input part 7, the transmitter part 32, the light/signal coupler part 14 and the bar code/mark reader part 4. The numerical value of the data detected by the data input part 100 is supplied as address data to a random access memory (RAM) 102 through a data write part 101. The RAM 102 has an area Ma which is addressed by the output of the data write part 101 and store oscillation data of surfaces and peripheries. A read-only memory (ROM) 103 has an area Mo which stores comments. The data read out from the RAM 102 is supplied to a character generator 104, and, after the input data is converted into dot data to be displayed on the display part 30, the data is written in a latch 105. The data written in the latch 105 is sequentially written in another random access memory (RAM) 106. The content of the RAM 106 is supplied to a display driver 107 to be converted into display data which is displayed on the display part 30. The data read out from the RAM 102 is inputted to a control part 108.

On the basis of the key input signal supplied from the keyboard part 7, the control part 108 supplies an operation command signal to both the character generator 104 and the latch 105, supplies a display change-over signal to the display driver 107, and supplies a function control command signal to a transmitter part 115 connected to a printer driver part 116.

The control part 108 supplies comment data to a comment data read part 110, and this comment data is supplied as address data to the area Mo of the ROM 103, so that comment data stored in the specified address region is read out to be supplied to a digital/analog (D/A) converter part 111. The D/A converter part 111 converts the comment data read out from the ROM 103 into an analog audio signal, and this analog audio signal is supplied to a speaker 114 through an audio converter part 112 and an amplifier 113 so as to generate an audible alarm.

It will be apparent from the above description that the luggage management system of the present invention is advantageous in that the efficiency of parcel collection is high, the management of received parcels is reliable, and the parcel delivery is efficient, so that missing of parcels 2 during delivery does not occur.

Further, because of the fact that the luggage management system of the present invention is not placed in operation unless one of the specific identification key numbers is inputted from the keyboard part, the security guaranteeing the safeguard, safety and reliability required for the quick home delivery of important parcels of customers is ensured. The provision of the specific identification key numbers is useful in that the parcels can be strictly safeguarded, and the possibility of losing any one of the parcels due to an error of parcel sorting and management can be avoided, so that the security of parcel information and parcel management can be improved.

Embodiment 2

Figure 8:
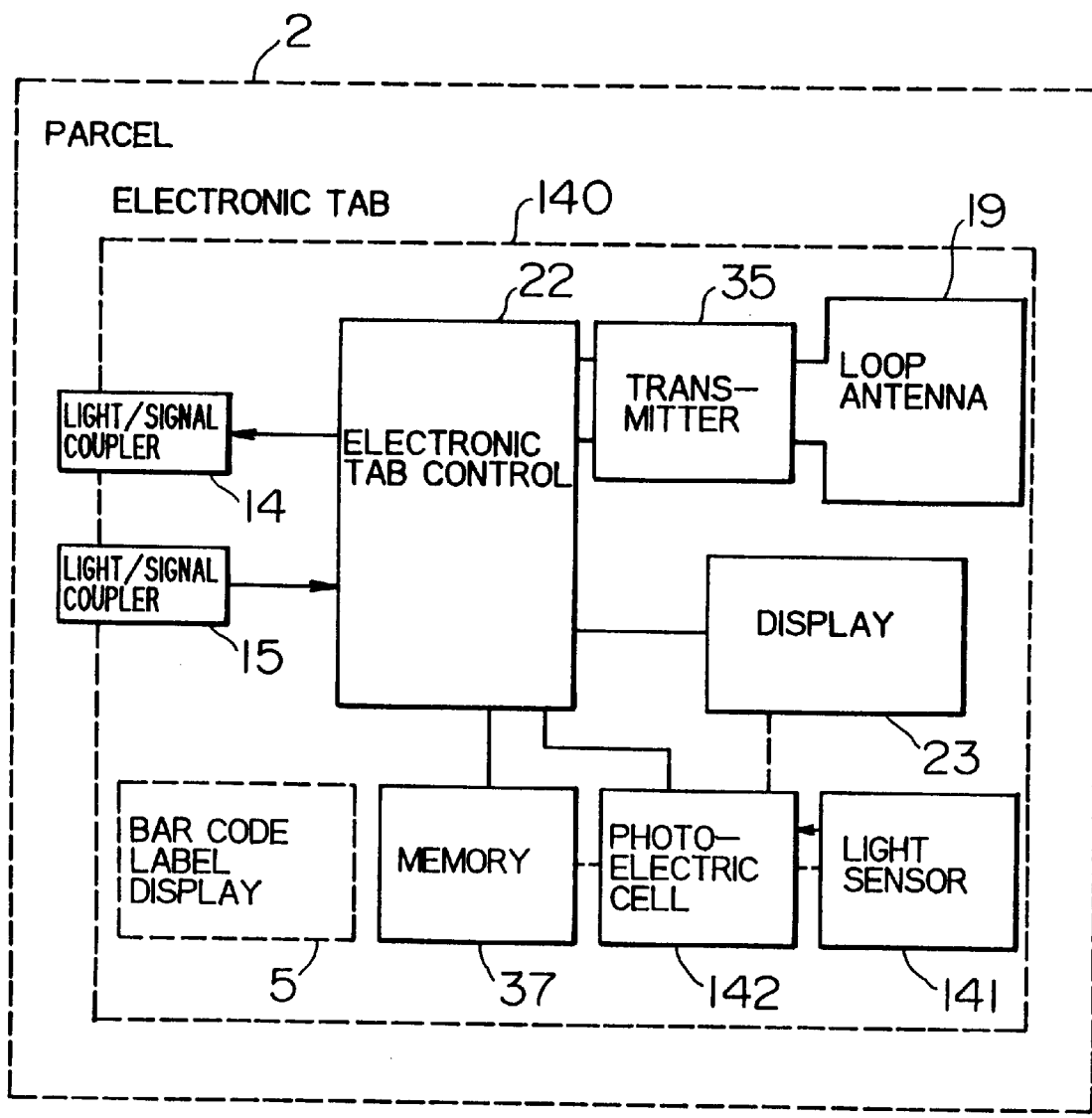
FIG. 8 is a block diagram showing the structure of an electronic tab used in a second embodiment of the luggage management system of the present invention.

FIG. 8 is a block diagram showing the structure of an electronic tab used in a second embodiment of the luggage management system of the present invention.

Referring to FIG. 8 in which like reference numerals are used to designate like parts appearing in FIG. 1, the electronic tab designated by the reference numeral 140 includes a photoelectric cell 142 acting as a power supply part, an incident light sensor 141 activating the power supply part 142, an electronic tab control part 22, a display part 23 displaying data of a parcel 2, a transmitter part 35 and a loop antenna 19. The power supply part 142 supplies required power to the electronic tab control part 22, the parcel data display part 23, the transmitter part 35 connected to the loop antenna 19, so that the individual functions are automatically started.

When the electronic tab 140 attached to the parcel 2 is irradiated with light, the light sensor 141 absorbs the energy of incident light, and an electrical change occurs thereinside. This electrical change includes an photoelectron emission effect emitting electrons, a photovoltaic effect generating electromotive force and a photoconductive effect causing a change in the resistance value. Thus, the light sensor 141 acts as a photoelectric converter converting the energy of incident light into corresponding electrical energy, so that information can be transmitted by modulating the electrical energy by the optical signal.

The photoelectric cell 142 is such that a potential difference appears at the junction between a p-type semiconductor and an n-type semiconductor or between a metal and a semiconductor when light is incident on the junction. An example of such a photoelectric cell 142 is a solar cell in which the surface of a piece of n-type silicon is covered with a layer of p-type silicon to generate electromotive force at the junction between them. The photoelectric cell 142 is preferably combined with an alkaline storage battery when it is desired to maintain sufficient electromotive force.

When parcels 2 are transshipped at an intermediate station located between a parcel collection station and a parcel delivery station, the destination numbers of the tabs on the parcels being conveyed by a belt conveyor are accurately sorted for the purpose of examining and managing the parcels so as to facilitate tracing of the parcels 2. When an optical signal or energy of light is directed onto the electronic tab 140 of each parcel 2 being conveyed by the belt conveyor, the incident light sensor 141 detecting the incident light acts to automatically activate the photoelectric cell 142, and power is supplied from the cell 142 to all of the electronic tab control part 22, the display part 23 displaying the data of the parcel 2, and the transmitter part 35 connected to the loop antenna 19 so as to automatically start the individual functions.

Figure 9A:
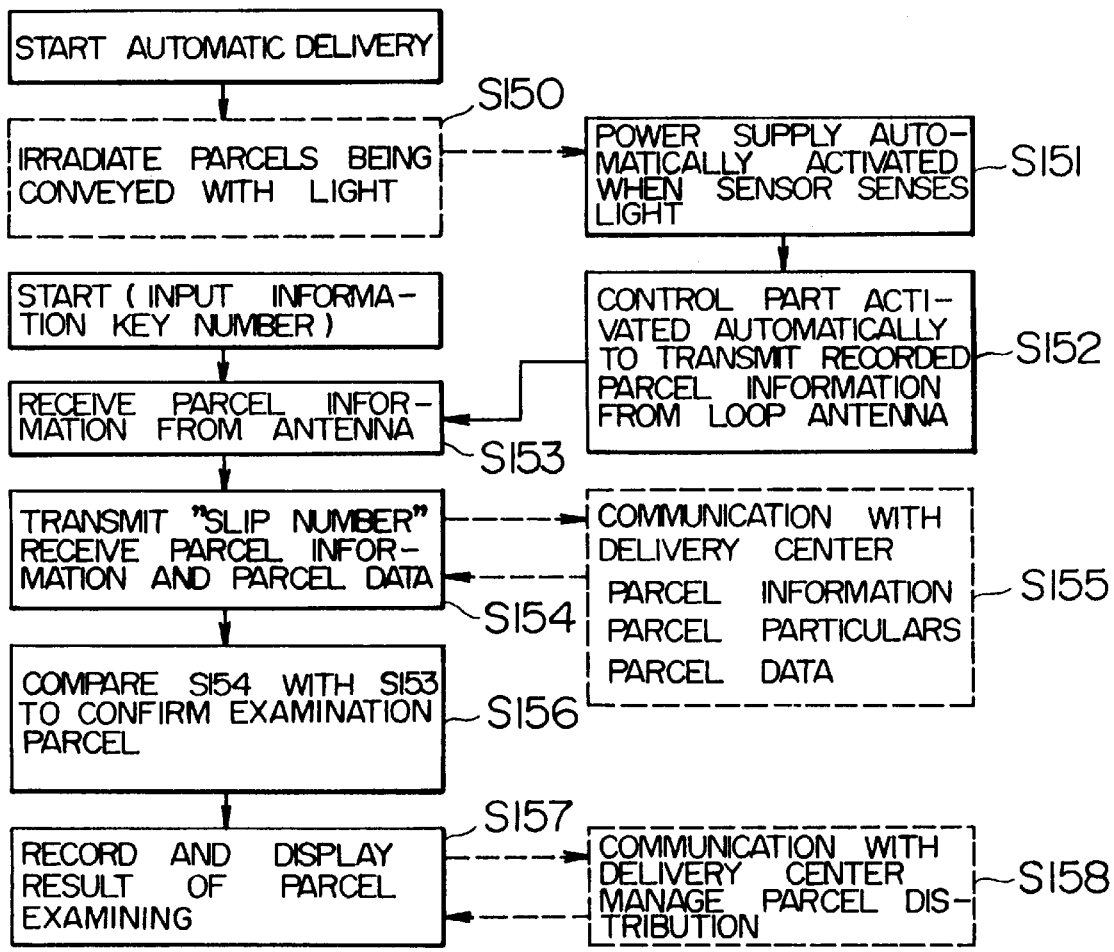
FIG. 9A is a flow chart showing the steps of automatic examining in the second embodiment of the luggage management system of the present invention.
Figure 9B:
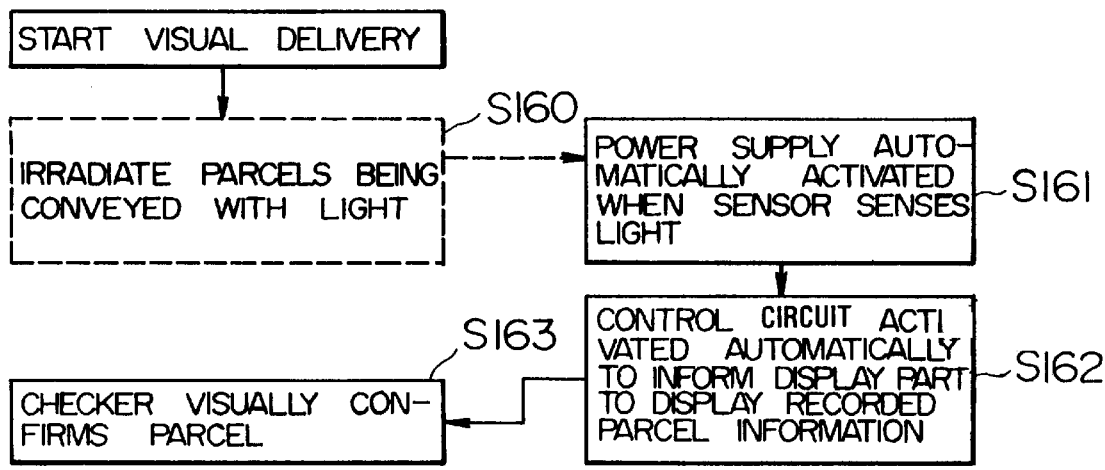
FIG. 9B is a flow chart showing the steps of visual examining in the second embodiment of the luggage management system of the present invention.

FIGS. 9A and 9B are flow charts showing the steps of automatic and visual parcel examining respectively in the second embodiment of the luggage management system of the present invention.

The operation of the second embodiment of the luggage management system of the present invention will now be described by reference to FIGS. 9A and 9B.

In a step S150 in FIG. 9A, each parcel 2 being conveyed is irradiated with an optical signal or energy of light. As soon as the light sensor 141 of the electronic tab 3 detects the optical signal or energy of light, the photoelectric cell 142 automatically generates electricity in a step S151, so that the circuit of the electronic tab control part 22 is automatically activated. Then, in a step S152, the parcel information and parcel data stored beforehand in the memory part 37, which is, for example, a PROM or like non-volatile memory, are modulated into a radio signal having a predetermined frequency to be transmitted from the transmitter part 35 to the exterior of the tab 3 through the loop antenna 19.

At the same time, after the optical signal or energy of light is detected, and the power supply voltage is supplied, the parcel information and parcel data are displayed for a predetermined period of time only on the display part 23 which is, for example, a flat type liquid crystal panel. In a step S153, the transmitted parcel information and parcel data are received by the antenna 11 of the portable handy terminal 1, and, in steps S154 to S158, the operation including examining by reading the parcel information and parcel data of each parcel 2, confirmation by collating the parcel data with that stored already, sorting and management is carried out.

On the other hand, in a step S160 in FIG. 9B, each parcel 2 being conveyed is irradiated with an optical signal or energy of light for simply examining the parcel 2 by visual inspection only. In a step S161, the optical signal or energy of light is detected to automatically activate the power supply, and, in a step S162, the "destination code", the "delivery route", the "serial slip number", etc. are displayed on the display part 23.

When the incident light sensor 141 is of the conventional type used for sensing visible rays of light, it always senses light in the daytime or in a bright space, and the photoelectric cell 142 is activated to supply the power supply voltage. Therefore, it is usually required to shield the light sensor 141 from incidence of unnecessary light by a dark room part or like means.

Thus, according to the second embodiment of the present invention, an incident light sensor 141 adapted to sense electromagnetic waves having a specific frequency only is used to control the supply of the power supply voltage.

It will be apparent from the foregoing description that the first embodiment of the present invention provides a luggage management system comprising an electronic tab in which information regarding delivery of a luggage is written beforehand, and a portable convenient terminal transmitting a luggage information request signal to the electronic tab, the electronic tab transmitting the luggage information to the portable convenient terminal and also displaying the luggage information in response to the request signal, and the portable handy terminal receiving the luggage information comparing the received luggage information with information stored therein to detect whether or not the former information coincides with the latter information. Therefore, the luggage management system is advantageous in that the information regarding each luggage can be smoothly read regardless of the size and shape of luggage, and, because of the capability of confirming the information regarding each luggage, the luggage collection efficiency is high, and the received luggage can be reliably managed without the possibility of missing any one of them.

It will be also apparent from the foregoing description of the first embodiment of the present invention that the portable convenient terminal comprises information issue means for issuing luggage information invention that the electronic tab comprises input means for inputting luggage information from the portable convenient terminal, memory means for storing the luggage information, transmitter and receiver means for transmitting and receiving the information to and from the portable convenient terminal, control means for controlling the electronic tab to transmit the luggage information stored in the memory means to the portable convenient terminal when the receiver means receives an information request signal from the portable convenient terminal, and display means for displaying the luggage information stored in the memory means when the receiver means receives a display request signal from the portable convenient terminal. Thus, because the information in the electronic tab can be remotely handled and received, the first embodiment of the present invention is advantageous in that the luggage information can be smoothly acquired regardless of the size and shape of the luggage. Further, because the luggage information can be displayed on the electronic tab, the first embodiment is also advantageous in that the luggage information can be quickly confirmed by the eyes of the operator.

Further, according to the first embodiment of the present invention, the luggage management system would not operate unless each individual identification key number is inputted from the keyboard of the portable handy terminal. Therefore, the security guaranteeing to be written in an electronic tab, keyboard means for inputting the luggage information, memory means for storing the luggage information, data transmission means for transmitting a data signal to and receiving a data signal from the electronic tab, control means for transmitting a luggage information request signal to the electronic tab by the data transmission means thereby receiving the luggage information of the electronic tab, examine means for examining whether or not the luggage information received through the data transmission means coincides with the luggage information stored in the memory means, display means for displaying both the luggage information stored in the memory means and the result of examining by the examine means, and safeguard means for ensuring the operation of all the components of the portable convenient terminal when an identification key number is inputted from the keyboard means. Thus, because the luggage information stored in the electronic tab can be simply and easily compared with that stored in the portable convenient terminal for the purpose of confirmation, the first embodiment of the luggage management system of the present invention is advantageous in that the efficiency of luggage sorting and management, luggage examining and tracing, and luggage delivery can be greatly improved, and the labor of the operators can be saved.

It will be also apparent from the foregoing description of the first embodiment of the present the safeguard, safety and reliability of delivery of important luggage of users, and strict application of the identification key numbers ensures the reliability of the luggage delivery, so that missing of any one of the luggage due to an error occurring during the luggage sorting operation and luggage management operation can be avoided to improve the security of the luggage information and its management. Thus, the operators participating in the luggage collection and freight charge collection, the luggage sorting and management and the luggage examining for tracing can acquire the desired luggage information without touching the luggage by their hands, and the luggage can be safely, accurately and efficiently transported and managed.

Further, it will be apparent from the foregoing description of the second embodiment of the present invention that the electronic tab further comprises incident light sensor means for sensing an optical signal, and a photoelectric cell generating electromotive force for activating the component means of the system as soon as the light sensor senses the optical signal. Therefore, the second embodiment of the present invention is advantageous in that the capacity of the power supply can be made small, and the electronic tab can also be made small in size, thin and flat. Further, the luggage management system of the present invention can be applied, when suitably constructed, to a ticket examining system for examining passenger tickets and commutation tickets for railway cars, buses, etc. so that the efficiency of examining the tickets of the passengers at the ticket gates of the railway stations and in the buses.

I claim:

1. A luggage management system comprising an electronic tab in which luggage information regarding delivery of luggage is written beforehand, and a portable convenient terminal for transmitting a luggage information request signal to said electronic tab, said electronic tab transmitting the luggage information to said portable convenient terminal and also displaying the luggage information in response to the request signal, and said portable convenient terminal comparing the received luggage information with information stored therein to detect whether or not the received luggage information coincides with said information stored therein, wherein said portable convenient terminal comprises information issue means for writing luggage information in said electronic tab and issuing said electronic tab, keyboard means for inputting the luggage information, memory means for storing the luggage information, data transmission means for transmitting a data signal to and receiving a data signal from said electronic tab, control means for transmitting the luggage information request signal to said electronic tab by said data transmission means thereby receiving the luggage information written in said electronic tab, examine means for examining whether or not the luggage information received through said data transmission means coincides with the luggage information stored in said memory means, display means for displaying both the luggage information stored in said memory means and the result of examining by said examine means, and safeguard means for ensuring the operation of all the components of said system when an identification key number is inputted from said keyboard means.

2. A luggage management system according to claim 1, wherein said electronic tab comprises input means for inputting the luggage information supplied from said portable convenient terminal, memory means for storing the luggage information, transmitter/receiver means for transmitting and receiving information to and from said portable convenient terminal, control means for controlling said electronic tab to transmit the luggage information stored in said memory means to said portable convenient terminal when said transmitter/receiver means receives the information request signal from said portable convenient terminal, and display means for displaying the luggage information stored in said memory means when said transmitter/receiver means receives a display request signal from said portable convenient terminal.

3. A luggage management system according to claim 2, wherein said electronic tab further comprises an incident light sensor sensing an incident optical signal, and a photoelectric cell activating the means composing the system when said light sensor senses the incident optical signal.

* * * * *